United States Patent Office 2,784,197
Patented Mar. 5, 1957

2,784,197
FLUORESCENT STILBYL DITRIAZOLE COMPOUNDS

Reinhard Zweidler, Basel, and Ernst Keller, Binningen, Switzerland, assignors to J. R. Geigy A. G., Basel, Switzerland, a Swiss firm No Drawing. Application March 17, 1955,
Serial No. 495,042

Claims priority, application Switzerland March 19, 1954

6 Claims. (Cl. 260—308)

Fluorescent stilbyl ditriazole compounds which are fast to chlorine are described in the copending application, Serial No. 495,041, filed on even date herewith, which are obtained, among other ways, by coupling diazotised 4-aminostilbene-2-sulphonic acids with an m-diamino compound of the benzene series which can be coupled twice to form the o-aminoazo dyestuff, oxidising this to form the corresponding 2-(stilbyl-4')-5-amino-1.2.3-benztriazole-2'-sulphonic acid, again coupling with an aromatic diazo compound and oxidising to form the ditriazole. Such stilbyl ditriazole compounds fluoresce in ultra-violet light green-blue and, because of their substantivity, they are suitable for the optical brightening of cellulose materia.

On further work being done on the subject matter of this invention it has been found that valuable, greenish-blue fluorescing substantive stilbyl ditriazole compounds are also obtained if the 2-(stilbyl-4')-5-amino-1.2.3-benztriazole-2'-sulphonic acids which are often described in the copending application as intermediate products are further diazotised, coupled with an azo component coupling in the o-position to a primary amino group and then oxidising the o-aminoazo dyestuff formed by methods known per se to form the ditriazole compound. The diazo component can be substituted in the 6-position, for example it can contain halogen, a methyl, alkoxy, aryloxy, a sulphonic acid or a modfied sulphonyl group.

Examples of azo components coupling in the o-position to a primary amino group are; 1-amino-3-alkoxy-4-methyl benzene, 1-amino-3.4-dialkoxybenzene, 1.3-diaminobenzene and derivatives thereof substituted in the 4-position by halogen, and alkyl, alkoxy, aryloxy, sulphonic acid and modified sulphonyl group as well as 2-aminonaphthalene compounds coupling preferably in the 1-position. If a 1.3-diaminobenzene compound is used as azo component, then the amino group remaining after the formation of the triazole is advantageously acylated or removed by diazotisation and reductive boiling out. Preferred 2-aminonaphthalene azo components are: 2-aminonaphthalene, 6-bromo-2-aminonaphthalene, 6- or 7-methoxy-2-aminonaphthalene, 2-aminonaphthalene-3-carboxylic acid, 2-aminonaphthalene-1-, -5-, -6-, or -7-sulphonic acid, 2-aminonaphthalene-3.6- or -5.7-disulphonic acid.

It is of advantage to use ammoniacal copper sulphate or alkali metal hypochlorites as oxidising agents.

The new stilbyl ditriazole compounds correspond to the general Formula I

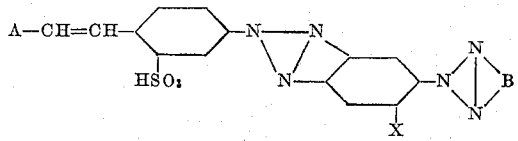

and are free from groups imparting dyestuff characteristics, i. e. chromophores such as nitro, azo and azoxy groups and aromatically bound hydroxy and amino groups. In this formula:

A represents a phenyl radical possibly substituted by simple substituents such as halogen, alkyl or alkoxy groups, B represents an o-phenylene or o-naphthylene radical which can possibly be substituted by halogen, alkyl, alkoxy, aryloxy, carboxylic acid, sulphonic acid or modified sulphonyl groups, X represents hydrogen, or a substituent like halogen, an alkyl, alkoxy, aryloxy, the carboxyl, the sulphonic acid or a modified sulphonyl group.

In the form of their water soluble alkali metal salts, the new stilbyl ditriazole compounds are yellow-brown powders which produce colourless to weakly yellowish coloured aqueous solutions and, in aqueous solutions or when adsorbed on to more or less white substrata such as, e. g. cellulose fibres, they have a strong green-blue fluorescence in ultra-violet light. Even from very diluted aqueous solutions which can contain salts, soaps, synthetic washing agents or oxidising bleaching agents, they draw on to cellulose fibres and, even in a very slight content, by the optical compensation of the yellowish appearance through the green-blue fluoresence light, they bring about a strong brightening in daylight. Also, in a very slight content and fine distribution, they lend to other more or less white substrata, such as for example starch, soap, synthetic washing agents, a better white appearance in daylight.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

EXAMPLE 1

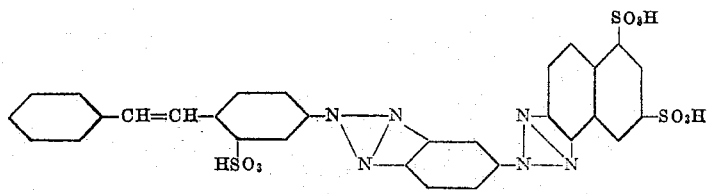

39.2 parts of 5-amino-2-(stilbyl-4')-1.2.3-benztriazole-2'-sulphonic acid are dissolved hot in 200 parts of dimethyl formamide, the solution is cooled somewhat, 200 parts of ice and about a 30% aqueous solution of 6.9 parts of sodium nitrite are added. The mixture is indirectly diazotised at a temperature of 8–10° by pouring it into a mixture of water, ice and 25 parts of concentrated hydrochloric acid. After stirring for a short time, the diazo suspension obtained is coupled at a temperature of 12–15° with an aqueous solution of the disodium salt of 30.3 parts of 2-aminonaphthalene-5.7-disulphonic acid and the mineral acid is buffered by the addition of 25 parts of crystallised sodium acetate. On completion of the coupling, the dyestuff is completely salted out by the addition of sodium chloride, filtered off and washed. The damp o-aminoazo dyestuff with the addition of caustic soda lye is dissolved in hot water with a phenolphthalein alkaline reaction and then about 100–120 parts of a sodium hypochlorite solution containing 17% of active chlorine are added dropwise within 15 minutes at a temperature of 30–35°. On completion of the dropwise addition, the temperature is raised within 1 hour to 80–85° during which time starch/iodide paper should always show an excess of active chlorine. The ditriazole compound is then completely salted out with sodium chloride, filtered off and washed. It is further purified by dissolving the damp raw product in hot water, adding 3–8 parts of hydrosulphite at a temperature of 92–97° to decompose oxidation products and filtering the solution hot with the addition of active charcoal. The product is again salted out, filtered off, washed and dried in the vacuum.

The ditriazole compound obtained of the above formula is a yellow powder; diluted solutions thereof are weakly yellowish coloured. Because of its substantivity, the compound draws on to cellulose fibres even from diluted solutions and lends these fibres a white shading in daylight. It can also be used as a brightening agent for soap powders and synthetic washing agents. On more or less white substrata, for example on cellulose fibres, it has excellent fastness to chlorine and very good fastness to light. The o-aminoazo dyestuff can also be oxidised with cuprammonium sulphate by dissolving the o-aminoazo dyestuff with 25 parts of 25% ammonia in hot water and then adding a mixture of 60 parts of crystallised copper sulphate in 240 parts of water and 120 parts of 25% ammonia and then holding at a temperature of 92–95° until the dyestuff is completely oxidised. On completion of the oxidation, the ditriazole compound is completely salted out, filtered off and washed. It is further purified by dissolving in hot water, removing the copper in the form of copper sulphide with sodium sulphide and decomposing reduceable oxidation products with sodium hydrosulphite. The compound is then salted out and dried in the vacuum. The compound obtained is identical to the product described above and has the same properties.

EXAMPLE 2

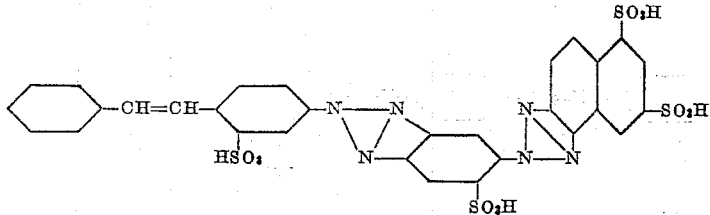

47.2 parts of 5-amino-2-(stilbyl-4')-1.2.3-benztriazole-2'.6-disulphonic acid in the form of the sodium salt are dissolved in 2000 parts of hot water, an aqueous solution of 6.9 parts of sodium nitrite is added and the whole is indirectly diazotised at a temperature of 8–10° with 25 parts of concentrated hydrochloric acid. The diazo suspension obtained is coupled at a temperature of 12–15° with an aqueous solution of the disodium salt of 30.3 parts of 2-aminonaphthalene-5.7-disulphonic acid with the addition of 25 parts of crystallised sodium acetate. On completion of the coupling, the dyestuff is salted out, filtered off and washed. The damp o-aminoazo dyestuff is then dissolved hot in hot water with the addition of caustic soda lye until there is phenolphthalein reaction and oxidised at a temperature of 35–40° as described in Example 1 with 100–120 parts of a sodium hypochlorite solution to form the ditriazole compound. It is then purified. The ditriazole compound of the above formula is a yellow powder which dissolves well in water. The product is a valuable brightening agent for cellulose fibres; the brightening effects obtained therewith are distinguished by their excellent fastness to chlorine.

EXAMPLE 3

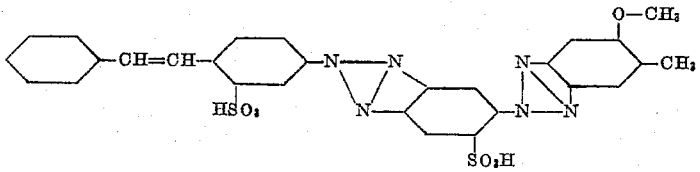

47.2 parts of 5-amino-2-(stilbyl-4')-1.2.3-benztriazole-2'.6-disulphonic acid are indirectly diazotised as described in Example 2 and then the diazo suspension obtained is coupled at a temperature of 12–15° with an aqueous solution of 13.7 parts of 1-amino-3-methoxy-4-methylbenzene in 11 parts of concentrated hydrochloric acid and 200 parts of water. 25 parts of crystallised sodium acetate are gradually added during the coupling. On completion of the coupling, the dyestuff is salted out, filtered off and washed. The damp o-aminoazo dyestuff is dissolved with 25 parts of 25% ammonia in hot water, a mixture of 60 parts of crystallised copper sulphate in 240 parts of water and 120 parts of 25% ammonia is added and the whole is kept at a temperature of 92–97° until the dyestuff is completely oxidised. The raw ditriazole compound is then salted out, filtered off and washed. The product is further purified by again dissolving in water, removing the copper in the form of copper sulphide by treatment with sodium sulphide and decomposing reduceable oxidation products with sodium hydrosulphite. The ditriazole compound is a yellow powder and can be used for the brightening of cellulose fibres, soap powders and synthetic washing agents. The brightening effects obtained therewith are distinguished by excellent fastness to chlorine and first-rate fastness to light.

If in the above example, the 1-amino-3-methoxy-4-methylbenzene is replaced by 15.3 parts of 1-amino-3.4-dimethoxybenzene then a ditriazole compound of the formula:

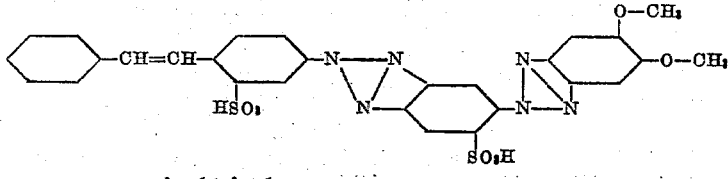

is obtained.

This compound is also a valuable brightening agent. Compared with that of the above named compound, its fluorescence is shifted more towards the long wave range. Adsorbed on to cellulose fibres it also has good fastness to chlorine and light.

EXAMPLE 4

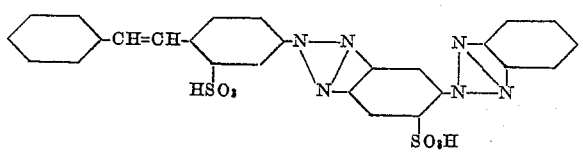

47.2 parts of 5-amino-2-(stilbyl-4')-1.2.3-benztriazole-2'.6-disulphonic acid are indirectly diazotised as described in Example 2 and the diazo suspension obtained is then coupled at a temperature of 12–15° with an aqueous solution of 10.8 parts of 1.3-diaminobenzene in 200 parts of water with the addition of 25 parts of crystallised sodium acetate. On completion of the coupling, the dyestuff is isolated, dissolved in hot water with the addition of 25 parts of 25% ammonia, a mixture of 60 parts of crystallised copper sulphate in 240 parts of water and 120 parts of 25% ammonia is added and the whole is kept at a temperature of 92–97° until the dyestuff is completely oxidised. The raw ditriazole compound is completely salted out, filtered off, de-coppered with excess sodium sulphide and purified with sodium hydrosulphite to remove reduceable oxidation products. The damp amino-ditriazole compound is then dissolved in water, indirectly diazotised, isolated and the diazo compound is warmed with dimethyl formamide, during which the diazo group is replaced by hydrogen while splitting off nitrogen. After further purification, the ditriazole of the above formula is obtained as a yellow powder. The compound can be used for the brightening of cellulose fibres, soap powders and synthetic washing agents. The brightening effects obtained therewith are distinguished by excellent fastness to chlorine and first-rate fastness to light.

A compound with a similar effect is obtained if in the above example the 1.3-diaminobenzene is replaced by 12.2 parts of 1.3-diamino-4-methylbenzene and procedure analogous to that described above is followed.

The ditriazole compound of the formula:

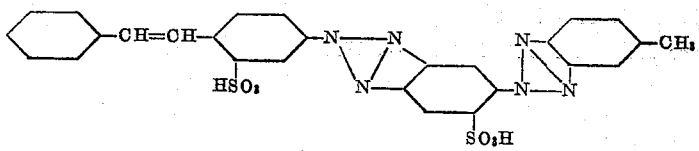

is a yellow powder and is an interesting brightening agent for cellulose fibres, soap powders and synthetic washing agents.

EXAMPLE 5

White cotton poplin is treated in a bath (liquor ratio 1:50) for 15 minutes at a temperature of 60° with 0.005% (calculated on the weight of the fibres) of the ditriazole compound obtained according to Example 2, the treatment being performed in the presence of 5% Glauber's salt (calculated on the weight of the fibres). After rinsing and drying, the material treated has a considerably more white appearance than before treatment.

EXAMPLE 6

1 part of white wash, e. g. pillow cases, sheets etc., are washed in the usual way at 90–100° in 10 parts of a wash liquor containing 3 g. of curd soap, 2 g. of sodium carbonate and 0.002 g. of the ditriazole compound obtained according to Example 2 per litre. The goods are then rinsed and dried. A dazzling white wash is obtained which has no unpleasant reddish tinge.

The following compounds can be produced by the methods described in Examples 1–4. They also have similar properties.

Table 1

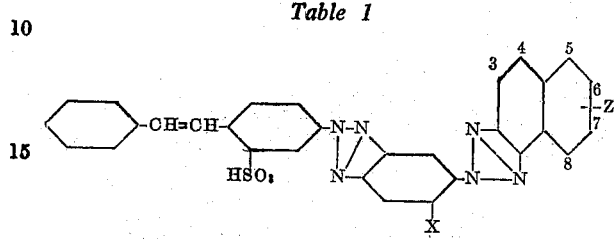

| No. | X= | Z= | Fluorescence colour in U. V. light; 0.01 g./litre |
|---|---|---|---|
| 1 | —SO₃H | —H | green. |
| 2 | —H | 5 —SO₃H | Do. |
| 3 | —H | 6,8 —SO₃H | green-blue. |
| 4 | —H | 4,8 —SO₃H | blue-green. |
| 5 | —CH₃ | 5,7 —SO₃H | green-blue. |
| 6 | —O—CH₃ | 5,7 —SO₃H | Do. |
| 7 | —Cl | 4,8 —SO₃H | Do. |
| 8 | —CH₃ | 4,8 —SO₃H | blue-green. |

Table 2

| No. | X= | Y= | Z= | Fluorescence colour in U. V. light; 0.01 g./litre |
|---|---|---|---|---|
| 9 | —H | 5 —Cl | 4 —O—CH₃ | green-blue. |
| 10 | —SO₃H | 5 —Cl | 4 —O—CH₃ | green. |
| 11 | —H | 5 —CH₃ | 4 —O—CH₃ | green-blue. |
| 12 | —H | 5 —O—CH₃ | 4 —O—CH₃ | Do. |
| 13 | —SO₃H | 5 —SO₃H | 4 —H | green. |
| 14 | —O—CH₃ | 5 —SO₃H | 4 —H | green-blue. |
| 15 | —Cl | 5 —SO₃H | 4 —H | Do. |
| 16 | —SO₃H | 5 —H | 4 —NH—CO—CH₃ | green. |
| 17 | —SO₃H | 5 —CH₃ | 4 —NH—CO—⌬ | Do. |

What we claim is:
1. A stilbyl distriazole compound corresponding to the general formula:

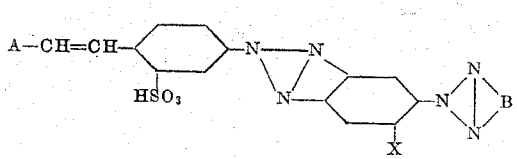

wherein A represents phenyl, B represents a member selected from the group consisting of o-phenylene, halogeno-o-phenylene, lower alkyl-o-phenylene, lower alkoxyo-phenylene, lower alkyl, lower alkoxy-o-phenylene, lower dialkoxy-o-phenylene, lower dialkoxy-o-phenylene, aroyl-amino-o-phenylene, sulpho-o-phenylene, 1.2-naphthylene, sulpho-1.2-naphthylene and disulpho - 1.2 - naphthylene radicals, and X represents a member selected from the group consisting of H, —CH₃, —O—CH₃, Cl and SO₃H.

6. As an optical brightening agent a stilbyl ditriazole compound of the formula:

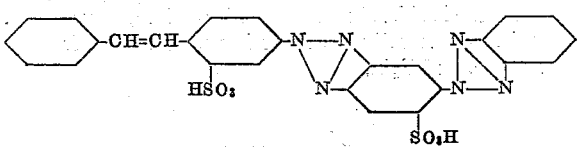

2. A stilbyl ditriazole compound of the formula:

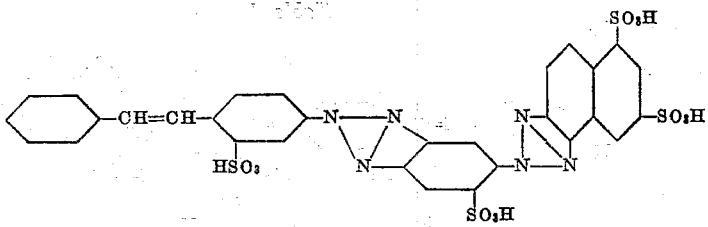

3. A stilbyl ditriazole compound of the formula:

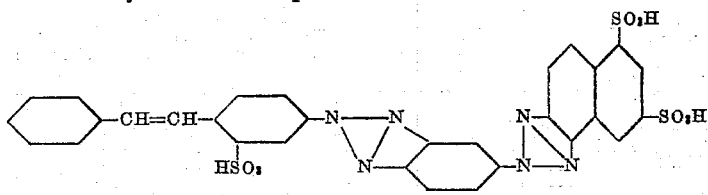

4. A stilbyl ditriazole compound of the formula:

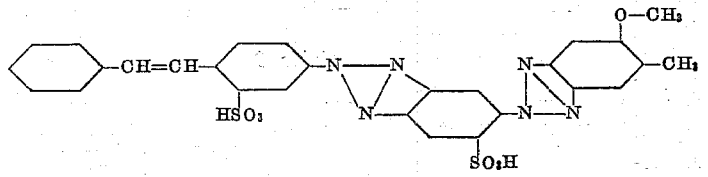

5. A stilbyl ditriazole compound of the formula:

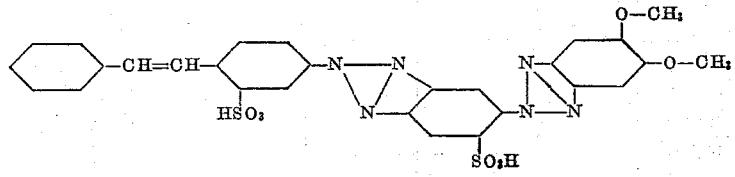

References Cited in the file of this patent

UNITED STATES PATENTS

| | | |
|---|---|---|
| 2,385,862 | Keller | Oct. 2, 1945 |
| 2,462,405 | Keller et al. | Feb. 22, 1949 |
| 2,467,262 | Knight | Apr. 12, 1949 |
| 2,668,777 | Gold et al. | Feb. 9, 1954 |
| 2,713,057 | Zweidler et al. | July 12, 1955 |

FOREIGN PATENTS

| | | |
|---|---|---|
| 1,054,820 | France | Oct. 14, 1953 |